United States Patent [19]

Porter, Jr. et al.

[11] Patent Number: 4,917,955

[45] Date of Patent: Apr. 17, 1990

[54] COLOR PLUS CLEAR COMPOSITE COATING HAVING A CATALYST-FREE BASE COAT COMPRISING POLYEPOXIDES AND POLYACID CURING AGENTS

[75] Inventors: Samuel Porter, Jr., Natrona Heights; Dennis A. Simpson, Koppel; William P. Blackburn, Evans City; Mark E. Endlish, Chicora, all of Pa.

[73] Assignee: PPG Industries, Inc., Pittsburgh, Pa.

[21] Appl. No.: 72,302

[22] Filed: Jul. 13, 1987

[51] Int. Cl.$^4$ .................... B05D 1/36; B05D 7/00; B32B 15/08

[52] U.S. Cl. ...................... 428/413; 428/689; 428/704; 428/463; 428/414; 428/416; 428/418; 427/407.1; 427/410

[58] Field of Search ............... 428/414, 413, 689, 704, 428/463; 427/407.1

[56] References Cited

U.S. PATENT DOCUMENTS

| | | | |
|---|---|---|---|
| 2,683,131 | 7/1954 | Cass | 260/45.4 |
| 2,712,535 | 7/1955 | Fisch | 260/45.4 |
| 2,857,354 | 10/1958 | Fang | 260/33.2 |
| 2,890,194 | 6/1959 | Phillips et al. | 260/45.4 |
| 2,890,210 | 6/1959 | Phillips et al. | 260/78.4 |
| 3,008,914 | 11/1961 | Fry | 260/33.4 |
| 3,179,714 | 4/1965 | Brockman et al. | 260/837 |
| 3,215,756 | 11/1965 | Lombardi et al. | 260/834 |
| 3,218,274 | 11/1965 | Boller et al. | 260/22 |
| 3,269,975 | 8/1966 | Lee | 260/37 |
| 3,408,215 | 10/1968 | Wismer et al. | 106/252 |
| 3,523,143 | 8/1970 | Kwong | 260/835 |
| 3,528,935 | 9/1970 | Marion et al. | 260/23 |
| 3,781,380 | 12/1973 | Labana et al. | 260/836 |
| 3,785,635 | 9/1973 | Labana et al. | 260/836 |
| 3,787,521 | 1/1974 | Labana et al. | 260/836 |
| 3,925,507 | 12/1975 | Katsimbas | 260/836 |
| 3,932,367 | 1/1976 | Labana et al. | 260/78.4 |
| 3,953,644 | 4/1976 | Camelon et al. | 428/220 |
| 3,954,712 | 5/1976 | Lottanti et al. | 260/47 |
| 3,975,314 | 8/1976 | Smyk et al. | 260/2 |
| 4,046,727 | 9/1977 | Itoh et al. | 260/28.5 |
| 4,102,942 | 7/1978 | Smith et al. | 428/413 X |
| 4,147,679 | 4/1979 | Scriven et al. | 428/426 X |
| 4,226,755 | 10/1980 | Knecht | 260/31.4 |
| 4,291,137 | 9/1981 | Nakate et al. | 525/162 |
| 4,346,144 | 8/1982 | Craven | 428/335 |
| 4,350,790 | 9/1982 | Chattha | 525/110 |
| 4,359,554 | 11/1982 | Labana et al. | 525/386 |
| 4,403,093 | 9/1983 | Hartman et al. | 528/297 |
| 4,418,182 | 11/1983 | Chattha | 525/438 |
| 4,465,815 | 8/1984 | Knecht | 525/443 |
| 4,471,025 | 9/1984 | Bernelin et al. | 428/413 |
| 4,548,963 | 10/1985 | Cluff et al. | 423/427 |
| 4,650,718 | 3/1987 | Simpson et al. | 428/413 |

FOREIGN PATENT DOCUMENTS

| | | |
|---|---|---|
| 84/00768 | 3/1984 | PCT Int'l Appl. . |
| 84/00770 | 3/1984 | PCT Int'l Appl. . |
| 84/00771 | 3/1984 | PCT Int'l Appl. . |

OTHER PUBLICATIONS

Handbook of Epoxy Resins, Henry Lee, Technical Director and Kris Neville, Project Engineer; The Eposylite Corporation; published by McGraw-Hill, Inc. 1967; Chapter 11, pp. 11-17 to 11-22.

*Primary Examiner*—P. C. Ives
*Attorney, Agent, or Firm*—Godfried R. Akorli

[57] ABSTRACT

There is disclosed herein a composite coating comprising a colored base coat over which is applied a clear top coat, the improvement comprising the base coat which comprises a liquid crosslinkable composition comprising a polyepoxide and a polyacid curing agent; said composition is characterized in that it is substantially free of a cure catalyst, and the top coat comprises a cure catalyst system in an amount sufficient to cure both the base coat and the top coat.

17 Claims, No Drawings

COLOR PLUS CLEAR COMPOSITE COATING HAVING A CATALYST-FREE BASE COAT COMPRISING POLYEPOXIDES AND POLYACID CURING AGENTS

BACKGROUND OF THE INVENTION

1. Field of Invention:

The present invention relates to curable compositions comprising polyepoxides and polyacid curing agents. More specifically, the present invention relates to curable coating compositions which are useful as composite coatings comprising color plus clear coatings. The invention also relates to a process for preparing color plus clear coated articles and to the coated articles themselves.

2. Brief Description of the Prior Art

Color plus clear coating systems involving the application of a colored or pigmented base coat to a substrate followed by the application of a transparent or clear top coat to the base coat are becoming increasingly popular as original finishes for automobiles. Color plus clear systems having outstanding gloss and distinctness of image (DOI) can be formulated with polyepoxides and polyacid curing agents to produce coatings with excellent adhesion, gloss and distinctness of image (i.e., ability to reflect images in a clear, well-defined manner). However, because of their instability in the presence of catalysts which are commonly used therewith, these compositions are not best suited to use as one-pack base coats. This presents a commercial limitation on these compositions since applicators generally prefer one-pack coatings. By the present invention, these compositions can be formulated into one-pack base coats for multiple coatings applications such as color plus clear applications.

SUMMARY OF THE INVENTION

In accordance with the foregoing, the present invention encompasses an improved composite coating comprising a color base coat over which is applied a clear top coat, the improvement comprising:

(a) the base coat which comprises a liquid crosslinkable composition containing a polyepoxide and a polyacid curing agent; said composition is characterized in that it is substantially free of a cure catalyst; and (b) the clear top coat which comprises a cure catalyst system in an amount sufficient to effectively cure both the base coat and the top coat.

The term "composite" is intended to denote that there is a combination of the essential characteristics of the individual coatings, i.e., the base and top coats to produce the final coating of this invention. By this invention, one is able to employ basically similar compositions in the base coat and top coat, thus enhancing an essential requirement of composite coatings, namely, compatibility of the multiple coatings.

DETAILED DESCRIPTION OF THE INVENTION

For the base coat, the essential ingredients of the crosslinkable compositions of the present invention are the polyepoxides and the polyacid curing agents.

Among the polyepoxides which can be used are epoxy-containing acrylic polymers which are preferred, epoxy condensation polymers such as polyglycidyl ethers of alcohols and phenols and certain polyepoxide monomers and oligomers.

The epoxy-containing acrylic polymer is a copolymer of an ethylenically unsaturated monomer having at least one epoxy group and at least one polymerizable ethylenically unsaturated monomer which is free of epoxy groups.

Examples of ethylenically unsaturated monomers containing epoxy groups are those containing 1,2-epoxy groups and include glycidyl acrylate, glycidyl methacrylate, and allyl glycidyl ether.

Examples of ethylenically unsaturated monomers which do not contain epoxy groups are alkyl esters of acrylic and methacrylic acid containing from 1 to 20 atoms in the alkyl group. Specific examples of these acrylates and methacrylates are methyl methacrylate, ethyl methacrylate, butyl methacrylate, ethyl acrylate, butyl acrylate, and 2-ethylhexyl acrylate.

Examples of other copolymerizable ethylenically unsaturated monomers are vinyl aromatic compounds such as styrene and vinyl toluene; nitriles such as acrylonitrile and methacrylonitrile; vinyl and vinylidene halides such as vinyl chloride and vinylidene fluoride; and vinyl esters such as vinyl acetate. Acid group-containing copolymerizable ethylenically unsaturated monomers, such as acrylic and methacrylic acid, are preferably not used because of the possible reactivity of the epoxy and acid group.

The epoxy group-containing ethylenically unsaturated monomer is preferably used in amounts of from about 5 to 60, more preferably from 20 to 50 percent by weight of the total monomers used in preparing the epoxy-containing acrylic polymer. Of the remaining polymerizable ethylenically unsaturated monomers, preferably from 40 to 95 percent, more preferably from 50 to 80 percent by weight of the total monomers are the alkyl esters of acrylic and methacrylic acid.

In preparing the epoxy-containing acrylic polymer, the epoxide functional monomers and the other ethylenically unsaturated monomers can be mixed and reacted by conventional-free radical initiated organic solution polymerization as generally described above.

The epoxy-containing acrylic polymer typically has a number average molecular weight between about 500 and 20,000, preferably 1,000 to 10,000, and more preferably 1,000 to 5,000. The molecular weight is determined by gel permeation chromatography using a polystyrene standard. In determining molecular weights in this fashion, it is not the actual molecular weights which are measured but an indication of the molecular weight as compared to polystyrene. The value which are obtained are commonly referred to as polystyrene numbers. However, for the purposes of this invention, they are referred to as molecular weights.

The epoxy condensation polymers which are used are polyepoxides, that is, those having a 1,2-epoxy equivalency greater than 1, preferably greater than 1 and up to 3.0. Examples of such epoxides are polyglycidyl ethers of polyhydric phenols and of aliphatic alcohols. These polyepoxides can be produced by etherification of the polyhydric phenol or aliphatic alcohol with an epihalohydrin such as epichlorohydrin in the presence of alkali.

Examples of suitable polyphenols are 2,2-bis(4-hydroxyphenyl)-propane (bisphenol A), 1,1-bis(4-hydroxyphenyl)ethane, and 2-methyl-1,1-bis(4-hydroxyphenyl)propane. Examples of suitable aliphatic alcohols are ethylene glycol, diethylene glycol, 1,2-propylene glycol, and 1,4-butylene glycol. Also, cycloaliphatic polyols such as 1,2-cyclohexanediol, 1,4-cyclohexanediol, 1,2-bis(hydroxymethyl)cyclohexane and hydrogenated bisphenol A can also be used.

Besides the epoxy-containing polymers described above, certain polyepoxide monomers and oligomers can be used. Examples of these materials are described in U.S. Pat. No. 4,102,942 in column 3, lines 1-16. Specific examples of such low molecular weight polyepoxides are 3,4-epoxycyclohexylmethyl, 3,4-epoxycyclohexanecarboxylate, and bis(3,4-epoxycyclohexylmethyl) adipate. These materials are aliphatic polyepoxides as are the epoxy-containing acrylic polymers. As mentioned above, the epoxy-containing acrylic polymers are preferred because they result in products which have the best combination of coating properties, i.e., smoothness, gloss, durability and solvent resistance. Such polymers have been found to be particularly good in the formulation of clear coats for color plus clear applications.

The polyepoxide is typically present in the liquid crosslinkable composition in amounts of about 25 to 75, preferably from 30 to 60 percent by weight based on total weight of resin solids. When the lower molecular weight polyepoxide is used, it is typically used in amounts of 1 to 40, preferably 5 to 30 percent by weight based on total weight of resin solids.

The polyacid curing agent contains two or more acid groups per molecule which are reactive with the polyepoxide to form a crosslinked coating as indicated by its resistance to organic solvent. The acid functionality is preferably carboxylic acid, although acids such as sulfonic acid may be used but their use is not preferred. Preferably, the polyacid curing agent is a carboxyl-terminated material having at least two carboxyl groups per molecule. Among the polyacid curing agents which may be used include carboxylic acid group-containing polymers such as acrylic polymers, polyesters, and polyurethanes; oligomers such as ester group-containing oligomers and monomers.

The preferred polyacid curing agents ar ester group-containing oligomers. Examples include half-esters formed from reacting polyols and 1,2-acid anhydrides. The half-esters are preferred because they are of relatively low molecular weight and are quite reactive with epoxy functionality enabling the formulation of high solids fluid compositions while maintaining outstanding properties such as gloss and distinctness of image.

The half-ester is obtained by reaction between a polyol and a 1,2-acid anhydride under conditions sufficient to ring open the anhydride forming the half-ester with substantially no polyesterification occurring. Such reaction products are of relatively low molecular weight with narrow molecular weight distributions and provide lower volatile organic contents in the coating composition while still providing for excellent properties in the resultant coating. By substantially no polyesterification occurring means that the carboxyl groups of the anhydride are not esterified by the polyol in a recurring manner. By this is meant that less than 10, preferably less than 5 percent by weight polyester is formed.

Two reactions may occur in combining the anhydride and the polyol together under suitable reaction conditions. The desired reaction mode involves ring opening the anhydride ring with hydroxyl, i.e.,

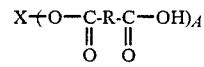

where X is the residue of the polyol after reaction with the 1,2-dicarboxylic acid anhydride, R is an organic moiety associated with the anhydride and A is equal to at least 2.

Subsequently, carboxyl groups formed by opening of the anhydride ring may react with hydroxyl groups to give off water via a condensation reaction. This latter reaction is not desired since it can lead to a polycondensation reaction resulting in products with higher molecular weights.

To achieve the desired reaction, the 1,2-acid anhydride and polyol are contacted together usually by mixing the two ingredients together in a reaction vessel. Preferably, reaction is conducted in the presence of an inert atmosphere, such as nitrogen, and in the presence of a solvent to dissolve the solid ingredients and/or to lower the viscosity of the reaction mixture. Examples of suitable solvents are high boiling materials and include, for example, ketones such as methyl amyl ketone, diisobutyl ketone, methyl isobutyl ketone; aromatic hydrocarbons such as toluene and xylene; as well as other organic solvents such as dimethyl formamide and N-methyl-pyrrolidone.

For the desired ring opening reaction and half-ester formation, a 1,2-dicarboxylic anhydride is used. Reaction of a polyol with a carboxylic acid instead of an anhydride would require esterification by condensation eliminating water which would have to be removed by distillation. Under these conditions, this would promote undesired polyesterification. Also, the reaction temperature is preferably low, that is, no greater than 135° C., preferably less than 120° C., and usually within the range of 70°-135° C., preferably 90°-120° C. Temperatures greater than 135° C. are undesirable because they promote polyesterification, whereas temperatures less than 70° C. are undesirable because of sluggish reaction.

The time of reaction can vary somewhat depending principally upon the temperature of reaction. Usually, the reaction time will be from as low as ten minutes to as high as 24 hours.

The equivalent ratio of anhydride to hydroxyl on the polyol is preferably at least about 0.8:1 (the anhydride being considered monofunctional) to obtain maximum conversion to the desired half-ester. Ratios less than 0.8:1 can be used but such ratios result in increased formation of less preferred half-esters.

Among the anhydrides which can be used in the formation of the desired polyesters are those which exclusive of the carbon atoms and the anhydride moiety contain from about 2 to 30 carbon atoms. Examples include aliphatic, including cycloaliphatic, olefinic and cycloolefinic anhydrides and aromatic anhydrides. Substituted aliphatic aromatic anhydrides are also included within the definition of aliphatic and aromatic provided the substituents do not adversely affect the reactivity of the anhydride or the properties of the resultant polyester. Examples of substituents would be chloro, alkyl, and alkoxy. Examples of anhydrides include succinic anhydride, methylsuccinic anhydride, dodecenyl succinic anhydride, octadecenylsuccinic anhydride, phthalic anhydride, tetrahydrophthalic anhydride, methyltetrahydrophthalic anhydride, hexahydrophthalic anhydride, alkyl hexahydrophthalic anhydrides such as methylhexahydrophthalic anhydride, tetrachlorophthalic anhydride, endomethylene tetrahydrophthalic anhydride, chlorendic anhydride, itaconic anhydride, citraconic anhydride, and maleic anhydride.

Among the polyols which can be used are those which contain from about 2 to 20 carbon atoms. Preferred are diols, triols and mixtures thereof. Examples include polyols containing from 2 to 10 carbon atoms. Examples include aliphatic polyols such as ethylene glycol, 1,2-propanediol, 1,3-propanediol, 1,4-butanediol, Ester Diol 204, 1,5-pentanediol, glycerol, 1,2,,3-butanetriol, 1,6-hexanediol, neopentyl glycol, diethylene glycol, dipropylene glycol, 1,4-cyclohexanedimethanol, trimethylolpropane, 2,2,4-trimethylpentane-1,3-diol, trimethylol propane, pentaerythritol, sorbitol, and 1,2,3,4-butanetetrol. Aromatic polyols, such as bisphenol A and bis(hydroxymethyl) xylene, can also be used.

In addition to the acid group-containing polymers and oligomers mentioned above, monomers containing at least two acid groups can also be used. Examples of suitable monomeric polycarboxylic acids are those containing from 5 to 20 carbon atoms and include open chain, cyclic, saturated, unsaturated, and aromatic acids. Examples include succinic acid, adipic acid, azelaic acid, sebacic acid, hexahydrophthalic acid, maleic acid, cyclohexane-1,3-dicarboxylic acid, and phthalic acid.

The polyacid curing agent is typically present in the coating composition in amounts of about 20 to 75, preferably 20 to 50 percent by weight based on total weight of resin solids.

The equivalent ratio of the reactants present in the composition is adjusted so that for each equivalent of epoxy there are 0.3 to 3.0, preferably 0.75 to 1.5 equivalents of carboxyl (anhydride if present being considered monofunctional).

The base coat composition contains pigments including metallic pigmentation to give it color. Examples of suitable pigmentations for the base coat are described in the aforementioned U.S. Pat. Nos. 4,220,679, 4,403,003 and 4,147,679.

Optional ingredients in the base coat composition are those which are well known in the art of formulating surface coatings and include surfactants, flow control agents, thixotropic agents, fillers, anti-gassing agents, organic co-solvents, and other customary auxiliaries. Examples of these materials and suitable amounts are described in the aforementioned U.S. Pat. Nos. 4,220,679, 4,403,003 and 4,147,679.

In accordance with this invention, the base coat is characterized in that it is free or substantially free of a cure catalyst. Hence, the base coat is stable and remains useful after an appreciable period of time. Illustratively, increase in viscosity measured with a No. 4 Ford cup is small after 16 hours at 140° F. or after one month at 75° F. and is preferably less than 10 seconds.

The base coat compositions can be applied to the substrate by any of the conventional coating techniques such as brushing, spraying, dipping or flowing, but they are most often applied by spraying. The usual spray techniques and equipment for air spraying and electrostatic spraying in either manual or automatic methods can be used.

In the typical embodiment of the invention, the clear coat is characterized in that it contains a cure catalyst system in amounts sufficient to principally catalyze the cure of the crosslinkable compositions of the base coat. In effective amounts the same catalyst can be employed to cure the crosslinkable compositions of the clear coat. Hence, the term "cure catalyst system" is used to denote that the same catalyst or more than one type of catalyst can be employed in the clear coat. In some instances the clear coat may be free of a catalyst for the base coat. In these instances, the base coat may be heated to a temperature sufficient to affect the requisite degree of cure.

Examples of suitable catalysts are basic materials and include organic amines and quaternary ammonium compounds such as pyridine, piperidine, dimethylaniline, diethylenetriamine, tetramethylammonium chloride, tetramethylammonium acetate, tetramethylbenzylammonium acetate, tetrabutylammonium fluoride, and tetrabutylammonium bromide, other onium salts such as phosphorium salts, tin compounds, and the like. The amount of catalyst is typically from about 0.5 to 10, preferably 0.5 to 3 percent by weight based on weight of resin solids.

The crosslinkable composition of the clear coat can be any film-forming composition useful in coating applications. Examples of the crosslinkable compositions can be polyepoxides, preferably aliphatic polyepoxides and more preferably epoxy-containing acrylic polymers, in combination with polyacid curing agents and cure catalysts. The preferred clear coat compositions are more fully described in U.S. Pat. Application Ser. No. 74,105, filed July 16, 1987 which is hereby incorporated by reference.

During application of the base coat to the substrate, a film of the base coat is formed on the substrate typically in a thickness of about 0.1 to 5 and preferably about 0.1 to 2 mils. After forming a film of the base coat on the substrate, solvent, that is, organic solvent and/or water, is driven out of the base coat film by heating or simply an air drying period before application of the clear coat. Preferably, the heating step will only be for a short period of time which is sufficient to ensure that the clear top coat composition can be applied to the base coat without the former dissolving the base coating compositions, that is, "striking in". Suitable drying conditions will depend on the base coat composition, on the ambient humidity with certain water-based compositions, but, in general, a drying time of from about one to five minutes at a temperature of about 80°-175° F. (27°-79° C.) will be adequate to ensure that mixing of the two coats is minimized. At the same time, the base coat film is adequately wetted by the clear top coat composition so that satisfactory intercoat adhesion can be obtained. Usually between coats, the previously applied base coat or top coat is flashed, that is, exposed to ambient conditions for about 1 to 20 minutes.

The clear top coat composition is applied to the base coat by any of the conventional coating techniques mentioned above, although spray applications are preferred. As mentioned above, the clear top coat is applied to the base coat via a wet-on-wet technique before the base coat has been cured. The two coatings are then heated to cojointly harden both coating layers.

The invention will be further defined by reference to the following examples. Unless otherwise indicated, all parts are by weight.

EXAMPLES

The following Examples A-C show the preparation of a polyepoxide and two polyacid curing agents which are useful in the practice of the present invention.

EXAMPLE A

| Ingredients | Weight in Grams | Percentage by Weight |
| --- | --- | --- |
| Glycidyl methacrylate | 2080.0 | 40.0 |
| Methyl methacrylate | 1716.0 | 33.0 |
| Butyl acrylate | 1300.0 | 25.0 |
| Styrene | 104.0 | 2.0 |
| VAZO-67[1] | 260.0 | 5.0 (on monomers) |
| Tertiary-butyl perbenzoate | 104.0 | 2.0 (on monomers) |
| Tertiary-butyl perbenzoate (post addition) | 26.0 | 0.5 (on monomers) |

[1]Alpha, alpha'-dimethylazobis(isobutyronitrile) available from E. I. du Pont de Nemours and Company.

Xylene (2996.7 grams) was charged to a suitable reactor and heated to reflux to remove water through a Dean-Stark trap. The glycidyl methacrylate, methyl methacrylate, butyl acrylate, and styrene were mixed together. The VAZO-67, first portion of tertiary-butyl perbenzoate and 500.0 grams of xylene were also premixed together. The premixture of vinyl monomers and the premixture of initiators were added simultaneously to the reaction vessel over a period of about three hours while maintaining the reaction temperature at reflux. At the completion of the addition, the reaction mixture was held at reflux for one hour followed by the addition of the second portion of tertiary-butyl perbenzoate and 100 grams of xylene. The reaction mixture was held for two hours at reflux followed by cooling to room temperature. The reaction mixture had a solids content of about 58 percent and a number average molecular weight of about 1,300 as determined by gel permeation chromatography using a polystyrene standard.

EXAMPLE B

A polyacid half-ester of 1-(3-hydroxy-2,2-dimethylpropyl)-3-hydroxy-2,2-dimethylpropionate (Ester Diol 204) and methylhexahydrophthalic anhyride was prepared from the following mixture of ingredients:

| Ingredients | Parts by Weight (in grams) |
| --- | --- |
| Ester Diol 204 | 2550.0 |
| Methylhexahydrophthalic anhydride | 4116.0 |
| Methyl isobutyl ketone | 1466.5 |
| Ethanol | 666.6 |

The Ester Diol 204 and 1466.5 grams of the methyl isobutyl ketone were charged to a reaction vessel and heated under a nitrogen atmosphere to 115° C. The methylhexahydrophthalic anhydride was added over a 90-minute period. The reaction mixture was then held at 115° C. for four hours. The reaction mixture was then cooled to 100° C. followed by the addition of ethanol (to react with residual anhydride) and heating the reaction mixture to reflux and holding for two hours. The reaction mixture was stripped to a pot temperature of 125° C. The reaction mixture was then adjusted to 80 percent solids with methyl isobutyl ketone.

EXAMPLE C

A polyacid half-ester of trimethylolpropane and methylhexahydrophthalic anhydride was prepared from the following mixture of ingredients:

| Ingredients | Parts by Weight (in grams) |
| --- | --- |
| Trimethylolpropane | 491.7 |
| Methylhexahydrophthalic anhydride | 1848.0 |
| Methyl isobutyl ketone | 1002.7 |

The ingredients were charged to a reaction vessel and heated under a nitrogen atmosphere to 100° C. to initiate an exotherm. The reaction mixture was kept at 110°-120° C. for about four hours, and then cooled to room temperature. The reaction mixture had a solids content measured at 110° C. of about 69.8 percent and an acid value of 203.

The following examples show the preparation of various curable compositions useful as clear coats in composite color-clear coatings.

EXAMPLE 1

This example illustrates a base coat without a cure catalyst.

| Ingredients | Parts by Weight (in grams) | Percent Resin Solids | Percent Pigment Solids |
| --- | --- | --- | --- |
| Hexyl acetate | 35.0 | — | |
| Xylene | 20.0 | — | |
| TINUVIN 328[1] | 3.0 | 3.0 | |
| Flow Control Agent[2] | 11.4 | 5.0 | |
| Epoxy-containing acrylic polymer of Example A | 81.9 | 47.5 | |
| Trimethylolpropane-methylhexahydrophthalic anhydride half-ester as in Example C | 39.1 | 27.4 | |
| Titanium dioxide (pigment paste) | 166.4 | 20.1 | 111.5 |

[1]Substituted benzotriazole UV light stabilizer from Ciba-Geigy Corporation.
[2]Polymeric microparticle prepared in accordance with Example 11 of U.S. Pat. No. 4,147,688.

The base coat was formulated by mixing the above ingredients with agitation.

The formulated coating composition contained 60 percent by weight resin solids and had a No. 4 Ford cup viscosity of 18.3 seconds.

EXAMPLE 2

A base coat composition similar to Example 1 was prepared except that it further contained a melamine resin.

| Ingredients | Parts by Weight (in grams) | Percent Resin Solids | Percent Pigment Solids |
| --- | --- | --- | --- |
| Hexyl acetate | 40.0 | — | |
| Xylene | 25.0 | — | |
| TINUVIN 328 | 3.0 | 3.0 | |
| Flow Control | 11.4 | 5.0 | |
| Epoxy-containing acrylic polymer of Example A | 62.2 | 36.1 | |
| Trimethylol propane-methylhexahydrophthalic anhydride half-ester of Example C | 29.7 | 20.8 | |
| RESIMINE 717[1] | 21.4 | 18.0 | |
| Titanium dioxide pigment paste | 166.4 | 20.1 | 111.5 |

[1]Melamine resin available from Monsanto Co.

The base coat was formulated by mixing the above ingredients with agitation. The resultant formulated coating composition had a resin solids content of 59.7 percent by weight and a No. 4 Ford cup viscosity of 18.1.

EXAMPLE 3

A clear coat was prepared as follows:

| Ingredients | Parts by Weight (in grams) | Percent Resin Solids |
|---|---|---|
| TINUVIN 328 | 3.0 | 3.0 |
| Polybutyl acrylate | 0.4 | 0.25 |
| Cellulose acetate butyrate | 1.0 | 0.25 |
| Hexyl acetate | 22.2 | — |
| Methyl isobutyl ketone | 11.2 | — |
| Epoxy-containing acrylic polymer as in Example A | 91.4 | 53.0 |
| Ester Diol 204-methyl-hexahydrophthalic anhydride half-ester as in Example B | 47.1 | 37.0 |
| RESIMINE 717 | 11.9 | 10.0 |

THe clear coat was formulated with the above ingredients with agitation.

EXAMPLE 4

A clear coat containing a polyepoxide, a polyacid curing agent, a cure catalyst, and further containing a melamine resin was prepared as follows:

| Ingredients | Parts by Weight (in grams) | Percent Resin Solids |
|---|---|---|
| TINUVIN 328 | 3.0 | 3.0 |
| Polybutyl acrylate | 0.4 | 0.25 |
| Cellulose acetate butyrate | 1.0 | 0.25 |
| Hexyl acetate | 22.0 | — |
| Methyl isobutyl ketone | 11.2 | — |
| Epoxy-containing acrylic polymer as in Example A | 91.4 | 53.0 |
| Ester Diol 204-methyl-hexahydrophthalic anhydride half-ester as in Example B | 47.1 | 37.0 |
| RESIMINE 717 | 11.9 | 10.0 |
| ARMEEN DM 12D[1] | 3.0 | 3.0 |

[1]Tertiary armine catalyst available from Armak Co.

The clear coat was formulated by mixing the above ingredients with agitation. The resultant formulated coating composition contained 55.7 percent resin solids and a had a No. 4 Ford cup viscosity of 23.8 seconds.

EXAMPLE 5

A clear coat comprising a melamine resin as the principal curing agent and a cure catalyst for the base coat and clear coat was prepared as follows:

| Ingredients | Parts by Weight (in grams) | Percent Resin Solids |
|---|---|---|
| TINUVIN 328 | 3.0 | 3.0 |
| Polybutyl acrylate | 0.4 | 0.25 |
| Cellulose acetate butyrate | 1.0 | 0.25 |
| Hexyl acetate | 38.0 | — |
| Methyl isobutyl ketone | 33.0 | — |
| RESIMINE 717 | 47.6 | 40.0 |
| Hydroxyl functional acrylic resinl[1] | 88.2 | 60.0 |
| Phenyl acid phosphate | 0.4 | 0.3 |
| ARMEEN DM 12D | 3.0 | 3.0 |

[1]Prepared with 40% hydroxy propyl acrylate, 20% styrene, 18% butyl methacrylate, 18% butyl acrylate, 0.5% methyl methacrylate, 2% acrylic acid; solids 70% in methyl amyl ketone, with about 6,000 peak molecular weight.

The clear coat was formulated by mixing the above ingredients with agitation. The resultant formulated coating composition contained 49.8 percent resin solids and had a No. 4 Ford cup viscosity of 20.0 seconds.

APPLICATION:

The base coats were spray applied to steel panels that had been electrocoated with UNIPRIME (a cationic electrodepositable composition available from PPG Industries, Inc.) at a temperature of 25° C. with a two-minute flash at room temperature. The thickness of the base coat was 0.9-1.2 mils. Thereafter and at room temperature, the clear coat compositions were applied to the base coats in varying thicknesses.

The composite coatings were baked for 30 minutes at 275° F. The coated substrates were then evaluated with the results as shown in the following table.

TABLE

| Base Coat | Clear Coat | Solvent Resistance[1] | Chip Resistance[2] | Gloss[3] | Distinctness[4] of Image (DOI) | Tukon[5] Hardness | Adhesion[6] |
|---|---|---|---|---|---|---|---|
| Example 1 | Example 4 | Excellent | 2 | 86 | 90 | 13.00 | 3 |
| Example 2 | Example 3 | Poor | 2 | 86 | 85 | 7.71 | 3 |
| Example 2 | Example 5 | Excellent | 6 | 95 | 85 | 15.90 | 5 |
| Example 2 | Example 4 | Excellent | 6 | 90 | 90 | 13.60 | 5 |

[1]Solvent resistance determined by placing five drops of xylene on coated panel, wiping off after five minutes scratching the solvent-contacted surface with a fingernail or with pencils of varying hardness. Excellent - No visual effect and no softening. Good - Some film swelling. Fair - Some film softening. Poor - Soft film. Failure - Dissolved film.
[2]Chip resistance determined with a Gravelometer, Model QGR from the Q Panel Co. The chip resistance test is conducted generally in accordance with the procedure of ASTM D3170-74 except the painted panel was chilled at −10° F. instead of 10° F. and more detailed photographic standards were used. Ratings are from 0 to 9 with 0 being a failure (large sections of paint chipped off) and 9 being good with very little, if any, of the paint chipping off.
[3]Twenty degree gloss measured with gloss meters manufactured by the Gardner Instrument Co., measurements were made on panels which were in a horizontal position.
[4]Measured with a C-Box manufactured by C-Box I²R Company.
[5]Measured by ASTM E-384 standard.
[6]Crosshatch adhesion by ASTM D-3359 standard.

Therefore, what is claimed is:
1. An improved composite coating comprising a colored basecoat over which is applied a clear top coat, the improvement comprising:
   (a) the base coat which comprises a liquid crosslinkable composition containing a polyepoxide and a polyacid curing agent; wherein the base coat is substantially free of a cure catalyst; and
   (b) the top coat comprises a cure catalyst system in an amount sufficient to effectively cure the composite coating.

2. The composition coating of claim 1 in which the equivalent ratio of acid to epoxy as recited in claim 1 (a) is from about 0.3 to 3:1.

3. The composite coating of claim 1 in which the polyepoxide as recited in claim 1 (a) is a copolymer of a monoethylenically unsaturated monomer having at least one epoxy group and at least one monoethylenically unsaturated monomer which is free of epoxy groups.

4. The composite coating of claim 3 in which the copolymer has a number average molecular weight of between 500 and 20,000.

5. The composite coating of claim 4 in which the copolymer is a copolymer of glycidyl acrylate or methacrylate with at least one other copolymerizable ethylenically unsaturated monomer.

6. The composite coating of claim 5 in which the other copolymerizable ethylenically unsaturated monomer comprises at least in part an alkyl ester of acrylic or methacrylic acid containing from 1 to 20 carbon atoms in the alkyl group.

7. The composite coating of claim 5 in which the glycidyl acrylate or methacrylate comprises from 5 to 60 percent of the monomers used in preparing the epoxy-containing acrylic polymer.

8. The composite coating of claim 3 in which the epoxy group-containing acrylic polymer is present in the crosslinkable composition in amounts of 10 to 90 percent by weight based on total weight of resin solids.

9. The composite coating of claim 1 wherein the base coat further contains an aminoplast.

10. The composite coating of claim 1 in which the polyacid curing agent as recited in claim 1 (a) is a half-ester of the structure:

$$X(O-\underset{\underset{O}{\|}}{C}-R-\underset{\underset{O}{\|}}{C}-OH)_A$$

where X is the residue of a polyol after reaction with the 1,2-dicarboxylic acid anhydride, R is an organic moiety associated with the anhydride, and A is equal to at least 2.

11. The coating of claim 10 in which the polyol is a diol, triol, or mixture thereof.

12. The coating of claim 11 in which the polyol is selected from the class consisting of trimethylolpropane, pentaerythritol, sorbitol, neopentyl glycol, 1,6-hexanediol, and 2,2-dimethyl-3-hydroxypropyl-2,2-dimethyl-3-hydroxypropionate.

13. The coating of claim 10 in which the 1,2-dicarboxylic acid anhydride is selected from the class consisting of hexahydrophthalic anhydride and alkyl-substituted hexahydrophthalic anhydrides.

14. The coating of claim 1 in which the half-ester is present in amounts of 10 to 90 percent by weight based on total weight of resin solids.

15. The coating of claim 1 wherein the cure catalyst of the clear coat is selected from the group consisting of tertiary amine, quaternary ammonium salts, phosphonium salts, and tin compounds.

16. An article of matter comprising a metallic substrate coated in accordance with the process of claim 6.

17. A process for applying a composite coating to a metallic substrate which comprises applying to the substrate a colored film-forming composition to form a base coat and applying to said base coat a clear film-forming composition to form a transparent top coat over the base coat wherein the base coat and the clear coat are as recited in claim 1.

* * * * *